(12) United States Patent
Venkataraman et al.

(10) Patent No.: US 11,452,161 B2
(45) Date of Patent: Sep. 20, 2022

(54) PACKET DATA NETWORK CONNECTION RE-ESTABLISHMENT

(71) Applicant: Apple Inc., Cupertino, CA (US)

(72) Inventors: Vijay Venkataraman, San Jose, CA (US); Rohit Matolia, Surat (IN); Alosious Pradeep Prabhakar, Singapore (SG)

(73) Assignee: Apple Inc., Cupertino, CA (US)

(*) Notice: Subject to any disclaimer, the term of this patent is extended or adjusted under 35 U.S.C. 154(b) by 213 days.

(21) Appl. No.: 16/889,968

(22) Filed: Jun. 2, 2020

(65) Prior Publication Data

US 2020/0383166 A1 Dec. 3, 2020

(30) Foreign Application Priority Data

Jun. 3, 2019 (IN) .............................. 201911021952

(51) Int. Cl.
| | |
|---|---|
| *H04W 76/19* | (2018.01) |
| *H04W 76/27* | (2018.01) |
| *H04W 8/20* | (2009.01) |
| *H04W 76/25* | (2018.01) |
| *H04W 76/30* | (2018.01) |

(52) U.S. Cl.
CPC ............ *H04W 76/19* (2018.02); *H04W 8/20* (2013.01); *H04W 76/25* (2018.02); *H04W 76/27* (2018.02); *H04W 76/30* (2018.02)

(58) Field of Classification Search
CPC ....... H04W 76/19; H04W 8/20; H04W 76/25; H04W 76/27; H04W 76/30
See application file for complete search history.

(56) References Cited

U.S. PATENT DOCUMENTS

| | | | |
|---|---|---|---|
| 10,701,611 | B2 | 6/2020 | Chin et al. |
| 2012/0182912 | A1* | 7/2012 | Watfa .................... H04W 68/12 |
| | | | 370/328 |
| 2016/0037533 | A1 | 2/2016 | Lee et al. |
| 2017/0134298 | A1* | 5/2017 | Walke .................... H04W 4/24 |
| 2017/0150545 | A1* | 5/2017 | Ramkumar ....... H04W 72/1273 |
| 2018/0199281 | A1 | 5/2018 | Baek et al. |

FOREIGN PATENT DOCUMENTS

KR 20180080226 A 11/2018

OTHER PUBLICATIONS

Examination Report for IN Application No. 201911021952, dated May 3, 2021, 6 pages.

* cited by examiner

*Primary Examiner* — Ricky Q Ngo
*Assistant Examiner* — Stephen N Steiner
(74) *Attorney, Agent, or Firm* — Kowert, Hood, Munyon, Rankin & Goetzel, P.C.

(57) ABSTRACT

This disclosure relates to techniques for a wireless device to re-establish a packet data network connection. The wireless device may establish a packet data network connection via a cellular link with a cellular base station. Information identifying a bearer associated with the packet data network connection may be stored by the wireless device. The wireless device may determine whether the bearer associated with the packet data network connection is active. The packet data network connection may be released by the wireless device and the wireless device may attempt to re-establish the packet data network connection if the bearer associated with the packet data network connection is determined to not be active.

20 Claims, 8 Drawing Sheets

PACKET DATA NETWORK CONNECTION RE-ESTABLISHMENT

PRIORITY DATA

This application claims benefit of priority to Indian Application No. 201911021952, titled "Packet Data Network Connection Re-Establishment", filed Jun. 3, 2019, which is hereby incorporated by reference in its entirety as though fully and completely set forth herein.

FIELD

The present application relates to wireless communications, and more particularly to systems, apparatuses, and methods for a wireless device to re-establish a packet data network connection.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. Accordingly, improvements in the field are desired.

SUMMARY

Embodiments are presented herein of apparatuses, systems, and methods for a wireless device to re-establish a packet data network connection.

According to the techniques described herein, a wireless device may be configured to determine when a default bearer associated with a packet data network connection is not active at the radio resource control layer of the wireless device. Based on the default bearer associated with the packet data network connection not being active, the wireless device may be able to determine to release the packet data network connection, e.g., to resolve a possible packet data network connection status mismatch between the wireless device and the network, as this may be an indicator that the packet data network connection may have already been released by the network. At least in some such scenarios, the wireless device may further follow up by re-establishing the packet data network connection. For example, in case of a packet data network connection that was established for a service which is still in use by the wireless device, the wireless device may attempt to re-establish the packet data network connection. The wireless device could determine that the service is still in use based on an application associated with the service being open, a timer associated with use of the service not yet being expired, etc. At least according to some embodiments, such techniques may result in a shorter setup delay time for data exchange for the service, and in some instances may potentially even help avoid data exchange failure.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
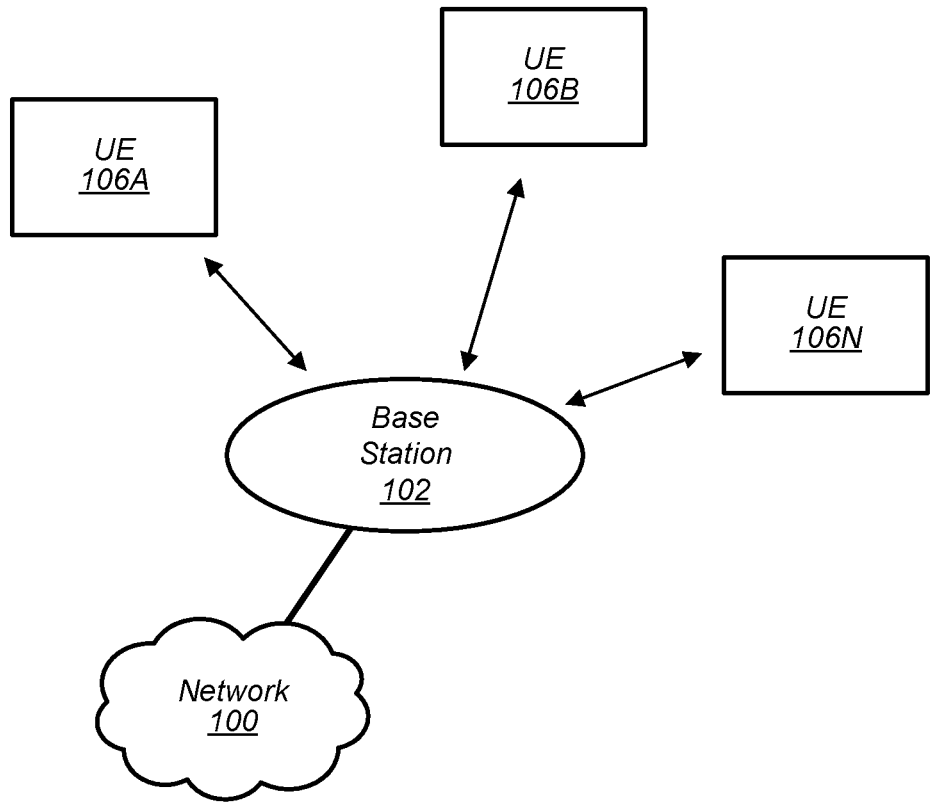
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:
UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
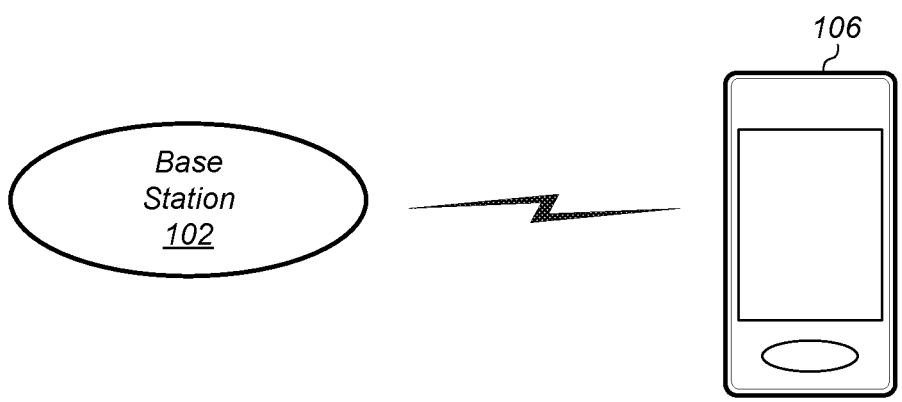
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to re-establish a packet data network connection such as according to the various methods described herein. The UE 106 might also or alternatively be configured to communicate using WLAN, BLUETOOTH', one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH'. Other configurations are also possible.

Figure 3:
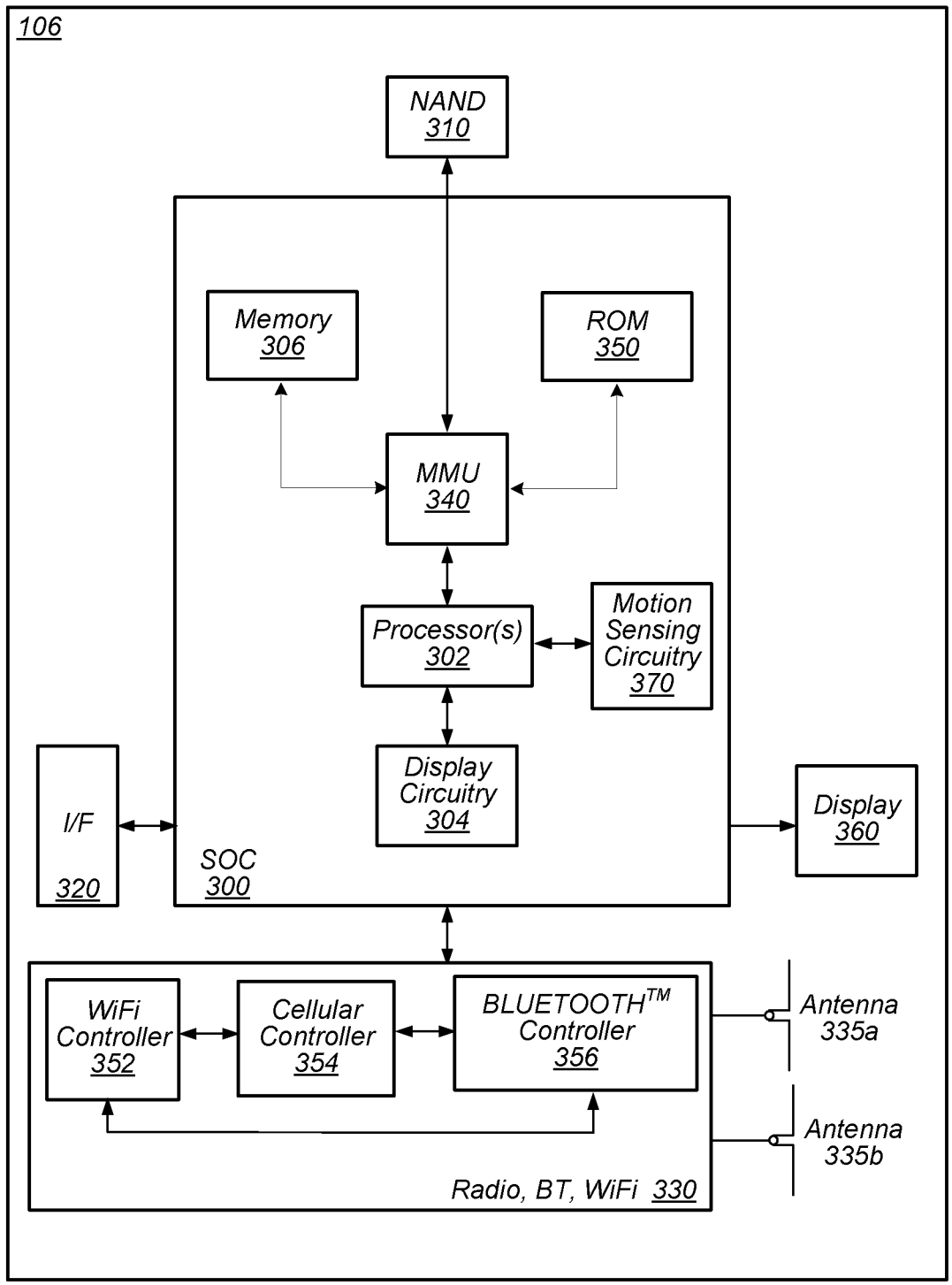
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to re-establish a packet data network connection such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to re-establish a packet data network connection according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
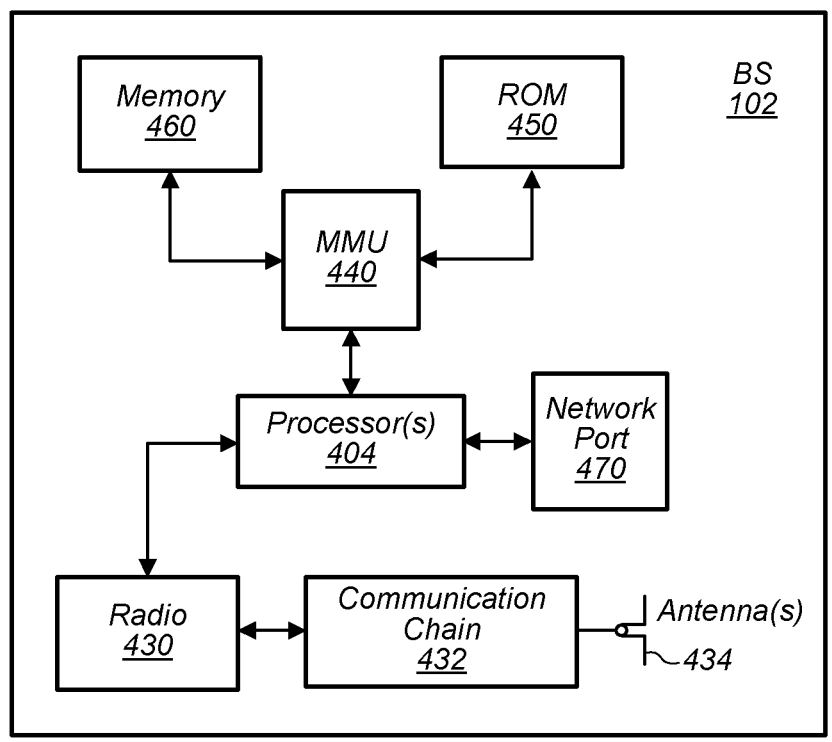
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Figure 5:
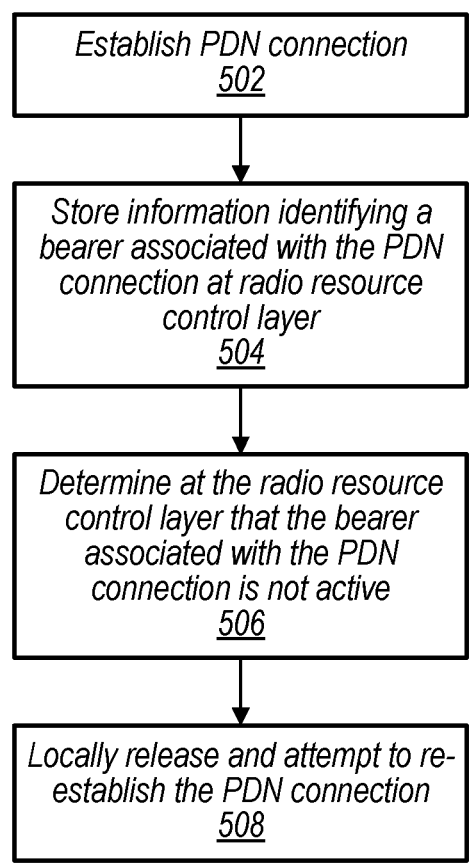
FIG. 5 is a flowchart diagram illustrating aspects of an exemplary possible method for a wireless device to re-establish a packet data network connection, according to some embodiments.

FIG. 5—Packet Data Network Connection Re-Establishment

FIG. 5 is a flowchart diagram illustrating a method for a wireless device (e.g., a wireless user equipment (UE) device, as one possibility) to re-establish a packet data network connection, according to some embodiments.

Aspects of the method of FIG. 5 may be implemented by a wireless device, e.g., in conjunction with one or more cellular base stations, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 5 are described in a manner relating to the use of communication techniques and/or features associated with LTE, LTE-A, NR, and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

A wireless device may establish a wireless link with a cellular base station. According to some embodiments, the wireless link may include a cellular link according to long term evolution (LTE). For example, the wireless device may establish a session with a mobility management entity of the cellular network by way of an eNB that provides radio access to the cellular network. As another possibility, the wireless link may include a cellular link according to 5G NR. For example, the wireless device may establish a session with an AMF entity of the cellular network by way of a gNB that provides radio access to the cellular network. Other types of cellular links are also possible, and the cellular network may also or alternatively operate according to another cellular communication technology (e.g., UMTS, CDMA2000, GSM, etc.), according to various embodiments.

Establishing the wireless link may include establishing a RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state. In some instances, the RRC connection may also be released (e.g., after a certain period of inactivity with respect to data communication), in which case the wireless device may operate in a RRC idle state or a RRC inactive state. In some instances, the wireless device may perform handover (e.g., while in RRC connected mode) or cell re-selection (e.g., while in RRC idle or RRC inactive mode) to a new serving cell, e.g., due to wireless device mobility, changing wireless medium conditions, and/or for any of various other possible reasons.

In 502, the wireless device may establish a packet data network (PDN) connection. The PDN connection may be established via the cellular link with the cellular base station, e.g., while the wireless device is in RRC connected mode. The PDN connection may be established at a non-access stratum (NAS) layer of the wireless device; for example, an evolved packet service (EPS) session management (ESM) function of an LTE NAS layer of the wireless device may establish the PDN connection, as one possibility.

The PDN connection may be established in conjunction with activity of a specific service type and/or application type active at the wireless device, at least according to some embodiments. For example, the PDN connection may be a connection to a gaming PDN that is established based on a gaming application launching at the wireless device. As another possibility, the PDN connection may be a connection to an augmented reality (AR) or virtual reality (VR) PDN that is established based on an AR or VR application launching at the wireless device. Still further possibilities could include an internet protocol (IP) multimedia subsystem (IMS) PDN connection (e.g., for an IMS call), an emergency PDN connection (e.g., for a call to emergency services), or any of various other possibilities.

When establishing the PDN connection, the wireless device may establish a bearer (e.g., a default EPS bearer) associated with the PDN connection. For example, the NAS layer of the wireless device may establish the EPS bearer associated with the PDN connection, which may provide a logical link to the core network of the cellular network with which the cellular base station serving the wireless device is associated. At least in some instances, one or more additional bearers (e.g., a dedicated EPS bearer, in addition to the default EPS bearer) may also be established in conjunction with the PDN connection. Further, one or more radio bearers may be established at the RRC layer, e.g., to provide the physical air interface between the wireless device and the cellular base station for the PDN connection.

In 504, the wireless device may store information identifying a bearer associated with the PDN connection at the RRC layer. The information identifying the bearer associated with the PDN connection at the RRC layer may include bearer identification information such as an EPS bearer ID (EBI) of the default EPS bearer for the PDN connection, as one possibility. Other identifying information may also be possible. Such information may be usable by the RRC layer to help determine whether the EPS bearer associated with the PDN connection is active, e.g., using one or more techniques described further subsequently herein, at least according to some embodiments.

In 506, the wireless device may determine at the RRC layer whether the bearer associated with the PDN connection is active. At least according to some embodiments, such a determination may be made based at least in part on a discontinuity in an RRC connection with the serving cellular base station of the wireless device. For example, in some instances, it may be possible that the cellular network could determine to release the PDN connection (and potentially correspondingly release any bearers associated with the PDN connection) during such a discontinuity and be unable to inform the wireless device that the PDN connection has been released. Such PDN connection release could occur due to network congestion (e.g., numerous new PDN connection requests in combination with a period of PDN connection inactivity (e.g., corresponding to the discontinuity in the RRC connection) by the wireless device, as one possibility. Other reasons for PDN connection release by the network are also possible (e.g., numerous different wireless devices requesting to create the same new PDN connection within a short interval). Thus, evaluating whether the bearer associated with the PDN connection is active based at least in part on a discontinuity to RRC connected mode communication may be helpful in determining whether such a network-side PDN connection release has occurred during the discontinuity to RRC connected mode communication.

As one example of a possible discontinuity to RRC connected mode communication, the wireless device may release its RRC connection (e.g., due to a certain period of data inactivity or for any of various other possible reasons) and later re-establish an RRC connection, either for signaling or data transfer. In such a scenario, determining whether the bearer associated with the PDN connection is active may be based at least in part on re-establishing the RRC connection after operating in RRC idle mode.

As another example of a possible discontinuity to RRC connected mode communication, the wireless device may be a dual SIM dual standby (DSDS) wireless device, and may interrupt use of its receiver circuitry (and possibly transmitter circuitry) for a first SIM to communicate using a second SIM (e.g., use of a data SIM could be interrupted by an incoming or outgoing voice call performed using a voice SIM) for a period of time before resuming using the receiver circuitry for the first SIM. In such a scenario, determining whether the bearer associated with the PDN connection is active may be based at least in part on resuming using the receiver circuitry for the first SIM after the interruption.

Note that in some instances, a minimum (threshold) amount of time of interruption to having an RRC connection (e.g., being in RRC idle and/or being tuned away to a different SIM) may be used as a trigger to determine whether the bearer associated with the PDN connection is active after resuming communicating using a RRC connection. Alternatively, it may be the case that any amount of time of interruption to having an RRC connection is considered sufficient to trigger determining whether the bearer associated with the PDN connection is active after resuming communicating using a RRC connection.

As a still further possibility, determining whether the bearer associated with the PDN connection is active may additionally or alternatively be performed based at least in part on any of various other (e.g., periodic, event based, etc.) triggers that may or may not be related to a discontinuity in an RRC connection. For example, it may also be possible for the PDN connection to be released without the wireless being made aware (e.g., due to packet loss and/or for any of various other reasons) even while the wireless device maintains RRC connected mode communication, although such circumstances may possibly be less likely than if there is an interruption to RRC connected mode communication.

In some instances, the wireless device may additionally or alternatively determine whether the bearer associated with the PDN connection is active based at least in part on whether one or more conditions for keeping the PDN connection active are met. For example, in some instances, it may occur that there is no further need for the PDN connection at the wireless device, in which case there may be no need to determine whether the bearer associated with the PDN connection is active. As one such possibility, if no application type or service type associated with the PDN connection is active at the wireless device, it may be the case that there is no need to re-establish the PDN connection. As other possibility, there may be a timer associated with keeping the PDN connection active, and if the timer has expired, it may be the case that there is no need to re-establish the PDN connection. Such a timer could be implemented in conjunction with data activity associated with the PDN connection, as one possibility; for example, a PDN connection activity timer could be used to track how long it has been since the most recent data activity for the PDN connection. This would enable maintenance of the PDN connection for a certain time window even if no application type or service type associated with the PDN connection is active at the wireless device, e.g., in case activity by an application type or service type associated with the PDN connection is resumed within the specified time window.

Thus, according to some embodiments, the wireless device may determine whether one or more conditions for keeping the PDN connection active are met, and determine whether the bearer associated with the PDN connection is active if one or more such conditions for keeping the PDN connection active are met. The one or more conditions could include one or more application types or service types associated with the PDN connection being active at the wireless device, a timer associated with keeping the PDN connection active being unexpired, and/or any of various other possible conditions.

Determining whether the bearer associated with the PDN connection is active may be performed in any of multiple possible ways. As one possibility, the wireless device may receive RRC reconfiguration information indicating bearer information for all active radio bearers for the wireless device. Such information may be provided, for example, when re-establishing a RRC connection, establishing a new RRC Connection, or possibly at any of various other times during a RRC connection. The wireless device may determine whether the RRC reconfiguration information indicates bearer identification information the bearer associated with the PDN connection, e.g., using the stored bearer identification information for the bearer associated with the PDN connection. At least according to some embodiments, it may be determined that the bearer associated with the PDN connection is active if the RRC reconfiguration information indicates bearer identification information for the bearer associated with the PDN connection, and it may be determined that the bearer associated with the PDN connection is not active if the RRC reconfiguration information does not indicate bearer identification information for the bearer associated with the PDN connection.

As another possibility, the wireless device may send dummy or test data via the bearer associated with the PDN connection. If the bearer remains active at the network side, the data may be acknowledged by the network, but if the bearer has been released (e.g., due to the PDN connection associated with the bearer being released), it may be the case that the data is not acknowledged by the network. Accordingly, the wireless device may determine whether acknowledgement of the dummy/test data sent via the bearer associated with the PDN connection is received. At least according to some embodiments, it may be determined that the bearer associated with the PDN connection is active if acknowledgement of the dummy/test data sent via the bearer associated with the PDN connection is received, and it may be determined that the bearer associated with the PDN connection is not active if acknowledgement of the dummy/test data sent via the bearer associated with the PDN connection is not received.

If the bearer associated with the PDN connection is determined to not be active, the RRC layer of the wireless device may provide an indication to the NAS layer, as well as to the application layer, that the bearer associated with the PDN connection is not active.

In 508, the wireless device may locally release and attempt to re-establish the PDN connection, e.g., based at least in part on determining that the bearer associated with the PDN connection is not active. For example, the NAS layer of the wireless device may release the PDN connection based on the indication from the RRC layer to the NAS layer that the bearer associated with the PDN connection is not active. For certain other PDNs, the application layer may initiate re-establishing the PDN connection. As the inactivity of the bearer associated with the PDN connection may be an indication of a PDN connection mismatch between the wireless device and the network, releasing the PDN connection (e.g., possibly including deleting any context information for the PDN connection) may resolve such a PDN connection mismatch, which may be necessary in order to re-establish PDN connectivity, at least according to some embodiments.

At least in some instances, the attempt to re-establish the PDN connection may be further based on one or more additional considerations. For example, as previously noted herein, in some instances, it may occur that there is no further need for the PDN connection at the wireless device, in which case there may be no need to re-establish the PDN connection. As one possibility, the wireless device may determine whether one or more conditions for keeping the PDN connection active are met (e.g., in addition or as an alternative to determining whether one or more such conditions are met as a basis for determining whether the bearer associated with the PDN connection is active), and attempt to re-establish the PDN connection at the NAS layer if one or more such conditions for keeping the PDN connection active are met. As previously described herein, such conditions could include one or more application types or service types associated with the PDN connection being active at the wireless device, a timer associated with keeping the PDN connection active being unexpired, a tune-away time by a DSDS wireless device exceeding a certain time threshold, and/or any of various other possible conditions.

Thus, the method of FIG. 5 may provide an approach to determining when a PDN connection status mismatch may have occurred and for determining when to re-establish a PDN connection based on such a possible PDN connection status mismatch. Such an approach may reduce instances of data exchange delay or failure for wireless devices for a variety of use cases, which could include IMS call services, emergency call services, gaming applications/services, AR/VR applications/services, and/or any of various other applications or services that make use of a specific or dedicated PDN, at least according to some embodiments.

FIGS. 6-9—Additional Information

FIGS. 6-9 and the following information are provided as being illustrative of further considerations and possible implementation details relating to the method of FIG. 5, and are not intended to be limiting to the disclosure as a whole. Numerous variations and alternatives to the details provided herein below are possible and should be considered within the scope of the disclosure.

Packet data network (PDN) connectivity may be used in conjunction with data exchange by wireless devices for a variety of services. Some examples could include short message service (SMS) calls, data bearers for gaming services, data bearers for augmented reality (AR) services, emergency call services, and numerous other possible services. In order to obtain such services, for example, a wireless device may typically establish PDN connectivity (e.g., for a specific access point name (APN) associates with a service the wireless device is attempting to obtain), establish a default bearer for the service PDN, and establish a dedicated bearer for packet transfer. Once the data exchange (call) ends, the dedicated bearer may be torn down, but the default bearer and the PDN connection may be kept up (e.g., by the wireless device and the network), at least in some instances. For example, in the case of an emergency call, an emergency call back mode (ECBM) timer may run for a certain period of time after an emergency call ends, e.g., to reduce call set up time in case of a follow-up emergency call. In such a scenario, the default/IMS PDN may be kept up until the ECBM timer expires. A PDN connection and associated default bearer may additionally or alternatively be kept up for a period of time in one or more other circumstances, such as for in the case of a gaming PDN connection, an IP multimedia subsystem (IMS) call, and/or other contexts.

Figure 6:
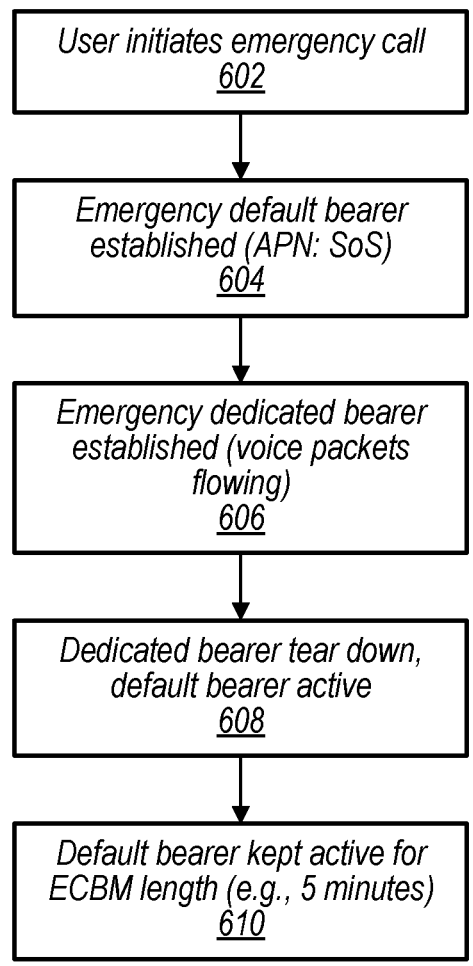
FIG. 6 is a flowchart diagram illustrating aspects of a possible packet data network connection establishment scenario for an emergency call, according to some embodiments.

Further to the emergency call example, FIG. 6 is a flowchart diagram illustrating aspects of a possible packet data network connection establishment scenario for an emergency call, according to some embodiments. In the illustrated scenario, a wireless device may be registered with a serving cellular network for normal service. In 602, a user of the wireless device may initiate an emergency call. If an emergency PDN connection is not already set up, the wireless device may establish emergency PDN connectivity (e.g., for APN "sos"). In 604, a default bearer for the emergency PDN connection may be established. In 606, a dedicated bearer for voice packets of the emergency PDN connection may be established. Once the emergency call ends, in 606, the dedicated bearer may be torn down. In 608, the UE and the network may continue to keep the emergency PDN connection up (e.g., including keeping the default bearer up) until an emergency callback mode timer (e.g., which may be initiated after the emergency call ends) expires. Keeping the emergency PDN connection up may be beneficial, at least in some instances, as it may assist with public safety access points (PSAP) obtaining the location of the user initiating the emergency call even after the voice call ends, and/or as there may be a tendency to redial emergency services within a certain period of time after an initial emergency call, e.g., to update the responders, and/or for any of various other reasons. Emergency call setup time may be reduced in such a scenario by keeping the emergency PDN connection up.

Figure 7:
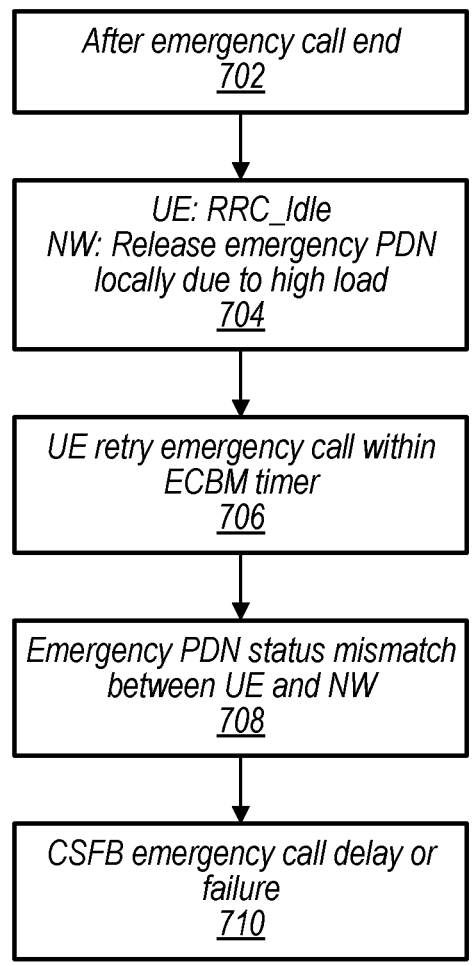
FIG. 7 is a flowchart diagram illustrating aspects of a possible scenario that could result in follow up emergency call delay or failure due to a packet data network connection status mismatch, according to some embodiments.

It is possible that in some instances (e.g., due to load on the network and/or for any of various other reasons), the network may locally release a PDN connection to a wireless device. In many instances, the network may inform the wireless device when a PDN connection of the wireless device is released; however, it is also possible that the wireless device might not be informed of such a PDN connection release. For example, if the wireless device is in RRC idle mode, or tuned away to a different RAT as part of a dual SIM dual standby (DSDS) configuration, when the PDN connection is released, it is possible that the wireless device may not be informed of the PDN connection release, such that there may be a PDN state mismatch between the wireless device and the network (e.g., the wireless device expects a valid PDN to be active, while the network has locally released the PDN). FIG. 7 is a flowchart diagram illustrating aspects of such a possible scenario, following from the example of FIG. 6 in which a user initiated an emergency call, according to some embodiments. As shown, the scenario may begin in 702, after the emergency call ends. The wireless device may transition from RRC connected mode to RRC idle mode, e.g., due to an RRC inactivity timer expiring, and/or based on an RRC connection release message received from the network. In 704, while the wireless device is in RRC idle mode, the network may release the emergency PDN connection internally, e.g., due to high load. Such a scenario might occur, for example, after a natural disaster, terrorist attack, or in any of various other instances in which an unusually large number of users are attempting to make emergency calls, among various other possible circumstances. In 706, while an ECBM timer is still running, the user may retry an emergency call. As the wireless device may expect the emergency PDN connection to still be active, the wireless device may attempt to establish a dedicated bearer for voice packets for the PDN connection, but since the same session does not exist on the network, there may be no response from the network. Thus, in 708, there may be an emergency PDN status mismatch between the wireless device and the network. As a result of the mismatch, the wireless device may wait for a timeout (which could be 10-20 seconds or any of various other possible lengths of time) before trying to fallback to another RAT (e.g., utilize circuit switched fallback (CSFB)) to attempt to establish the emergency call, if another such RAT is available. Thus, in 710, the wireless device may experience a potentially noticeable delay to establishing the emergency call (e.g., due to waiting for timeout and eventually performing the call using CSFB), or even experience call failure (e.g., if no CSFB capable RAT is available, such as in a LTE-only deployment region).

While such an emergency call scenario may represent one possible scenario in which such a setup delay or failure could occur, numerous other such scenarios are also possible. For example, as previously noted, in case of DSDS tuneaway time windows (e.g., while transmit/receive capabilities of a data SIM are suspended in order to use those transmit/receive capabilities for another SIM), or due to congestion (e.g., a network may locally release a PDN connection for users with inactivity (such as those in RRC idle mode) due to a relatively large number of active users), it may be possible for a wireless device to not receive a message or indication that a PDN connection has been released by the network. Accordingly, a PDN connection status mismatch between a wireless device and a network could occur for any of a variety of PDN connections associated with any of a variety of services. Such services could include gaming services, AR services, IMS services, and/or any of various other services, e.g., for which a specific PDN connection may be established to provide a dedicated bearer with Guaranteed Quality of Service (QOS).

Accordingly, it may be beneficial, at least in some instances, to provide techniques for a wireless device to determine when such a PDN connection status mismatch may have occurred. One possible approach to such a technique may include use of RRC layer awareness of whether a bearer for a PDN connection remains active. For example, after LTE RRC connection setup (e.g., for internet data/signaling/emergency/etc.), the network may typically provide a RRCReconfiguration message, in which the network may configure a set of active evolved packet service (EPS) bearer identifiers (EBIs) and associated active data bearers for the wireless device. This parameter may inform the UE of all active bearers across all PDN connections of the wireless device (e.g., potentially regardless of what triggered the RRC connection). The EBI may remain unchanged for a particular bearer until the bearer is deactivated. However, it may be the case that the RRC layer does not receive or store any information regarding EBI bearer type (e.g., with which PDN connection it is associated), while data and IMS layer signaling flows only on the respective EBIs.

Thus, as part of such an approach, if a PDN connection is established for a specific service such as gaming services, AR services, IMS services, and/or any of various other services, the higher layers (e.g., EPS session management (ESM) function in the non-access stratum (NAS) layer) may inform the LTE RRC layer. When a bearer is established for the PDN connection, the RRC may save the EBI for the bearer as associated with the PDN connection. During an active window for the PDN connection (e.g., while an application associated with the PDN connection is active at the wireless device, or while a timer associated with the PDN connection (e.g., a ECBM timer) is active, or as configured in any of various other possible ways), for any RRC connection established in this window (which may be established for any of various purposes that may or may not be related to the PDN connection), the wireless device may determine whether the network configures as an active EBI the EBI associated with the PDN connection. If the network does configure as an active EBI the EBI associated with the PDN connection, this may indicate that the network has not released the PDN connection, and the wireless device may continue its operation, e.g., as normal. If the network does not configure as an active EBI the EBI associated with the PDN connection, this may indicate that the network has locally dropped the PDN connection. In such a case, the wireless device may inform the data and ESM layer of this event, and possibly request that they locally delete the respective PDN context at the wireless device side. The ESM PDN context may be locally released, and if it is still the active window for the PDN connection, the wireless device may trigger a new PDN context establishment, e.g., to re-establish the PDN connection.

Figure 8:
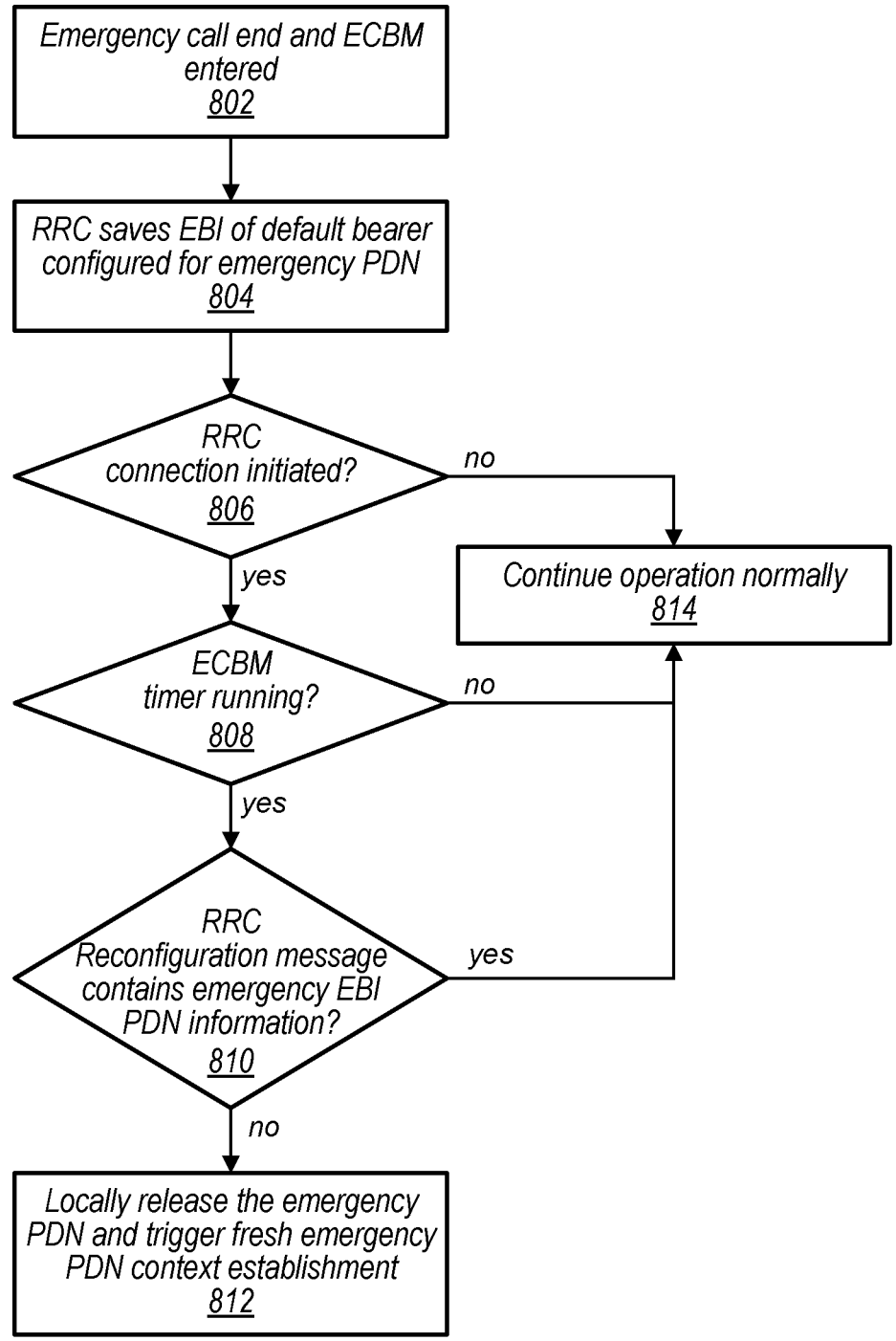
FIG. 8 is a flowchart diagram illustrating further exemplary aspects of one possible approach to re-establishing a packet data network connection, according to some embodiments.

FIG. 8 is a flowchart diagram illustrating how such an approach could be implemented in an emergency call scenario, according to some embodiments. As shown, in 802, an emergency call may end and ECBM may be entered. In 804, the RRC layer may save the EBI of the default bearer configured for the emergency PDN. In 806, it may be determined if an RRC connection is established. If an RRC connection is established, in 808, it may be determined if the ECBM timer is still running. If the ECBM timer is still running, in 810, it may be determined if the RRC reconfiguration message for the RRC connection includes the EBI of the emergency PDN. If the RRC reconfiguration message for the RRC connection does not include the EBI of the emergency PDN, in 812, the emergency PDN may be locally released and a fresh emergency PDN context establishment may be triggered. Otherwise, if no RRC connection is initiated, or if the ECBM timer is no longer running when the RRC connection is initiated, or if the RRC reconfiguration message for the RRC connection includes the EBI of the emergency PDN, in 814 the wireless device may continue operation, e.g., as normal.

As another (e.g., additional or alternative) approach to determine when to refresh a PDN context at a wireless device, the wireless device may test whether a bearer associated with a certain PDN connection is still active. According to such an approach, the higher layers (e.g., the ESM function in the NAS layer) may inform the LTE RRC layer whenever a specific purpose PDN connection is newly established. When a bearer is established for the PDN connection, the RRC may save the EBI for the bearer as associated with the PDN connection. During an active window for the PDN connection, for any new service request in this window, the wireless device may attempt to send dummy/test data packets on the bearer associated with the PDN connection. If no acknowledgement is received to the dummy/test data packets, this may indicate that the network has locally released the bearer associated with the PDN connection. In such a case, the wireless device may inform the higher layers of this event, the ESM PDN context may be locally released, and a new PDN context establishment may be triggered, e.g., to re-establish the PDN connection.

Figure 9:
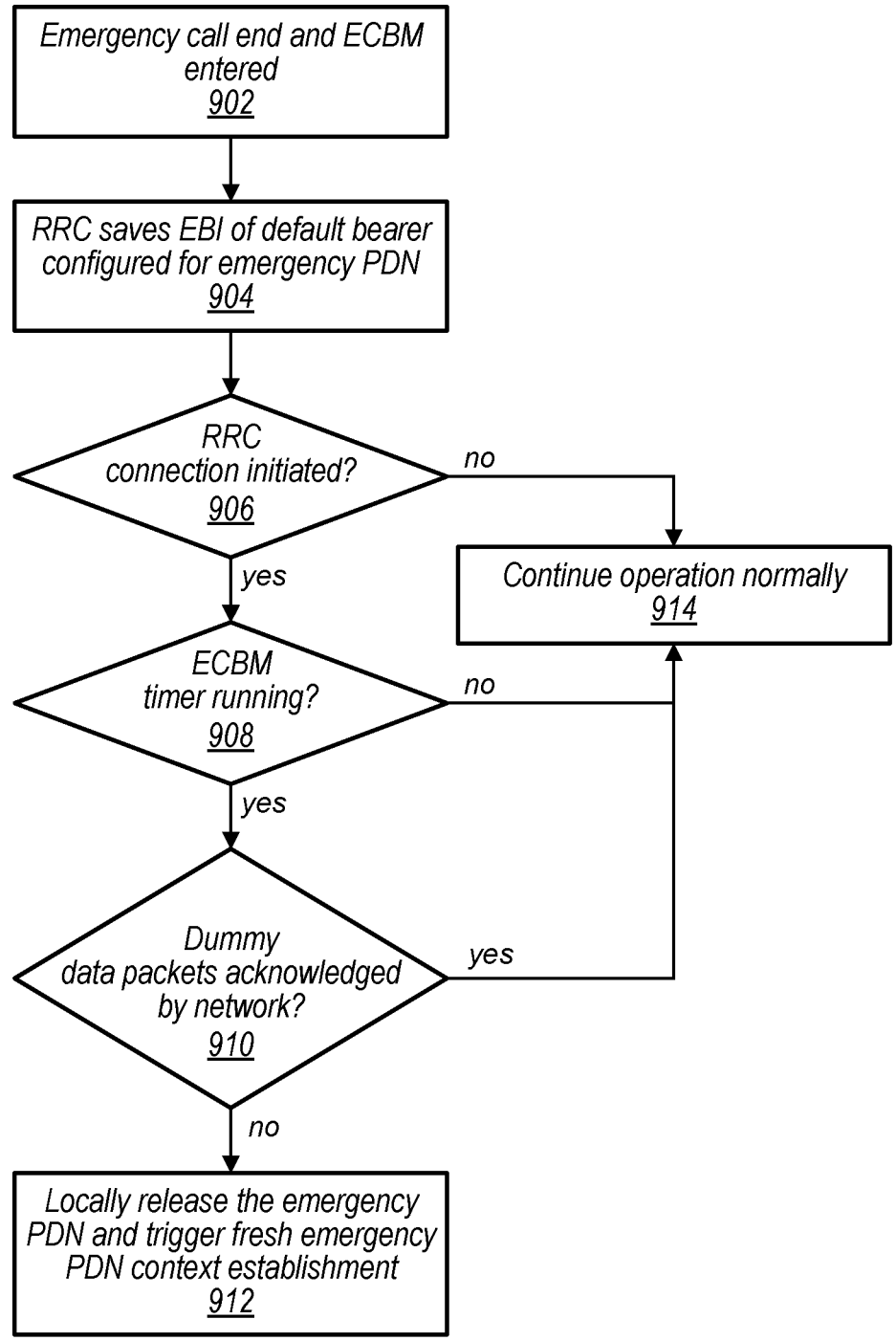
FIG. 9 is a flowchart diagram illustrating further exemplary aspects of another possible approach to re-establishing a packet data network connection, according to some embodiments.

FIG. 9 is a flowchart diagram illustrating how such an approach could be implemented in an emergency call scenario, according to some embodiments. As shown, in 902, an emergency call may end and ECBM may be entered. In 904, the RRC layer may save the EBI of the default bearer configured for the emergency PDN. In 906, it may be determined if an RRC connection is established. If an RRC connection is established, in 908, it may be determined if the ECBM timer is still running. If the ECBM timer is still running, in 910, it may be determined if dummy data packets provided via the bearer configured for the emergency PDN are acknowledged by the network. If the dummy data packets provided via the bearer configured for the emergency PDN are not acknowledged by the network, in 912, the emergency PDN may be locally released and a fresh emergency PDN context establishment may be triggered. Otherwise, if no RRC connection is initiated, or if the ECBM timer is no longer running when the RRC connection is initiated, or if the dummy data packets provided via the bearer configured for the emergency PDN are acknowledged by the network, in 914 the wireless device may continue operation, e.g., as normal.

Thus, using such approaches, it may be possible to handle ESM state mismatches between a network and a wireless device, with less delay in reinitiating services for a user, e.g., in case of DSDS tuneaway events or idle mode operation resulting in the wireless device not being informed of PDN context release. IMS call delays and setup failures due to state mismatch or congestion may also be handled using the techniques described herein, at least according to some embodiments. Further, using the mechanisms described herein, it may be possible to improve the likelihood that an emergency PDN over LTE remains valid during ECBM windows. Thus, it may be possible to reduce the call setup delay time for emergency calls, and to avoid scenarios in which an emergency call may not be re-tried over the CS domain, e.g., in LTE-only deployment regions, at least according to some embodiments.

In the following further exemplary embodiments are provided.

One set of embodiments may include an apparatus, comprising: a processing element configured to cause a dual subscriber identity module (SIM) dual standby (DSDS) wireless device to: establish a cellular link with a cellular base station using a first SIM; establish a packet data network (PDN) connection using the first SIM; store information identifying a bearer associated with the PDN connection; interrupt using receiver circuitry of the wireless device for the first SIM to communicate using a second SIM, wherein the wireless device does not monitor the cellular link with the cellular base station while the receiver circuitry of the wireless device is used to communicate using the second SIM; resume using receiver circuitry of the wireless device for the first SIM; determine whether the bearer associated with the PDN connection is active after resuming using receiver circuitry of the wireless device for the first SIM based at least in part on the interruption to using receiver circuitry of the wireless device for the first SIM; and release the PDN connection if it is determined that the bearer associated with the PDN connection is not active.

According to some embodiments, to determine whether the bearer associated with the PDN connection is active, the processing element is further configured to cause the wireless device to: receive radio resource control (RRC) reconfiguration information indicating bearer identification information for all active bearers for the wireless device; and determine whether the RRC reconfiguration information indicates bearer identification information for the bearer associated with the PDN connection, wherein it is determined that the bearer associated with the PDN connection is active if the RRC reconfiguration information indicates bearer identification information for the bearer associated with the PDN connection, wherein it is determined that the bearer associated with the PDN connection is not active if the RRC reconfiguration information does not indicate bearer identification information for the bearer associated with the PDN connection.

According to some embodiments, to determine whether the bearer associated with the PDN connection is active, the processing element is further configured to cause the wireless device to: send dummy data via the bearer associated with the PDN connection; and determine whether acknowledgement of the dummy data sent via the bearer associated with the PDN connection is received, wherein it is determined that the bearer associated with the PDN connection is active if acknowledgement of the dummy data sent via the bearer associated with the PDN connection is received, wherein it is determined that the bearer associated with the PDN connection is not active if acknowledgement of the dummy data sent via the bearer associated with the PDN connection is not received.

According to some embodiments, the PDN connection is associated with a service type, wherein determining whether the bearer associated with the PDN connection is active after resuming using receiver circuitry of the wireless device for the first SIM is further based at least in part on one or more conditions associated with the service type being met, wherein the processing element is further configured to cause the wireless device to attempt to re-establish the PDN connection based at least in part on the one or more conditions associated with the service type being met.

According to some embodiments, the one or more conditions associated with the service type comprise the service type being in active use at the wireless device.

According to some embodiments, the one or more conditions associated with the service type comprise a timer associated with possible data activity according to the service type being unexpired.

According to some embodiments, the cellular link includes an LTE link, wherein the bearer associated with the PDN connection includes an evolved packet service (EPS) bearer.

Another set of embodiments may include a wireless device, comprising: an antenna; a radio operably coupled to the antenna; and a processing element operably coupled to the radio; wherein the wireless device is configured to: establish a packet data network (PDN) connection via a cellular link with a cellular base station, wherein the PDN connection is established by a non-access stratum (NAS) layer of the wireless device; store information identifying a bearer associated with the PDN connection at a radio resource control (RRC) layer of the wireless device; determine, at the RRC layer, that the bearer associated with the PDN connection is not active; provide an indication from the RRC layer to the NAS layer that the bearer associated with the PDN connection is not active; and release the PDN connection at the NAS layer based at least in part on the indication that the bearer associated with the PDN connection is not active.

According to some embodiments, to determine that the bearer associated with the PDN connection is not active, the wireless device is further configured to: receive radio resource control (RRC) reconfiguration information indicating bearer identification information for all active bearers for the wireless device; and determine that the RRC reconfiguration information does not indicate bearer identification information for the bearer associated with the PDN connection.

According to some embodiments, to determine whether the bearer associated with the PDN connection is active, the wireless device is further configured to: send dummy data via the bearer associated with the PDN connection; and determine that no acknowledgement of the dummy data sent via the bearer associated with the PDN connection is received.

According to some embodiments, the wireless device is further configured to: determine whether one or more conditions for keeping the PDN connection active are met; and attempt to re-establish the PDN connection at the NAS layer if one or more conditions for keeping the PDN connection active are met.

According to some embodiments, the one or more conditions for keeping the PDN connection active comprise one or more of: one or more application types or service types associated with the PDN connection being active at the wireless device; or a timer associated with keeping the PDN connection active being unexpired.

According to some embodiments, the wireless device comprises a dual subscriber identity module (SIM) dual standby (DSDS) wireless device, wherein determining that the bearer associated with the PDN connection is not active is performed based at least in part on an interruption to using a first SIM of the DSDS wireless device caused by use of a second SIM of the DSDS wireless device.

According to some embodiments, determining that the bearer associated with the PDN connection is not active is performed based at least in part on operating in RRC idle mode for at least a threshold amount of time after the PDN connection is established.

Yet another set of embodiments may include a method, comprising: by a wireless device: establishing a radio resource control (RRC) connection with a cellular base station; establishing a packet data network (PDN) connection via the RRC connection; storing information identifying a bearer associated with the PDN connection; releasing the RRC connection, wherein the wireless device operates in RRC idle mode after the RRC connection is released; re-establishing a RRC connection with a cellular base station; determining whether the bearer associated with the PDN connection is active after re-establishing the RRC connection with a cellular base station; releasing the PDN connection if the bearer associated with the PDN connection is not active; and attempting to re-establish the PDN connection based at least in part on releasing the PDN connection.

According to some embodiments, determining whether the bearer associated with the PDN connection is active after re-establishing the RRC connection further comprises: receiving RRC reconfiguration information indicating bearer identification information for all active bearers for the wireless device; and determining whether the RRC reconfiguration information indicates bearer identification information for the bearer associated with the PDN connection.

According to some embodiments, determining whether the bearer associated with the PDN connection is active further comprises: sending data via the bearer associated with the PDN connection; and determining whether acknowledgement of the data sent via the bearer associated with the PDN connection is received.

According to some embodiments, the PDN connection is established based at least in part on an application type associated with the PDN connection being active at the wireless device, wherein the method further comprises: determining whether an application type associated with the PDN connection is active at the wireless device after re-establishing the RRC connection with a cellular base station, wherein determining whether the bearer associated with the PDN connection is active after re-establishing the RRC connection, releasing the PDN connection if the bearer associated with the PDN connection is not active, and attempting to re-establish the PDN connection are performed based at least in part on determining that an application type associated with the PDN connection is active at the wireless device after re-establishing the RRC connection.

According to some embodiments, the application type associated with the PDN connection comprises one or more of: a gaming application; an augmented reality (AR) application or a virtual reality (VR) application; or an internet protocol (IP) multimedia subsystem (IMS) application.

According to some embodiments, the method further comprises: determining whether a timer associated with the PDN connection is expired after re-establishing the RRC connection with a cellular base station, wherein determining whether the bearer associated with the PDN connection is active after re-establishing the RRC connection, releasing the PDN connection if the bearer associated with the PDN connection is not active, and attempting to re-establish the PDN connection are performed based at least in part on determining that the timer associated with the PDN connection is not expired after re-establishing the RRC connection.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus, comprising:
at least one processor configured to cause a dual subscriber identity module (SIM) dual standby (DSDS) wireless device to:
establish a cellular link with a cellular base station using a first SIM;
establish a packet data network (PDN) connection using the first SIM;
store information identifying a bearer associated with the PDN connection;
interrupt using receiver circuitry of the wireless device for the first SIM to communicate using a second SIM, wherein the wireless device does not monitor the cellular link with the cellular base station while the receiver circuitry of the wireless device is used to communicate using the second SIM;
resume using receiver circuitry of the wireless device for the first SIM;
determine whether the bearer associated with the PDN connection is active after resuming using receiver circuitry of the wireless device for the first SIM based at least in part on the interruption to using receiver circuitry of the wireless device for the first SIM, wherein said determining whether the bearer associated with the PDN is active comprises:
receiving radio resource control (RRC) reconfiguration information indicating bearer identification information for all active bearers for the wireless device; and
determining whether the RRC reconfiguration information indicates bearer identification information for the bearer associated with the PDN connection, wherein it is determined that the bearer associated with the PDN connection is active if the RRC reconfiguration information indicates bearer identification information for the bearer associated with the PDN connection, wherein it is determined that the bearer associated with the PDN connection is not active if the RRC reconfiguration information does not indicate bearer identification information for the bearer associated with the PDN connection; and
release the PDN connection if it is determined that the bearer associated with the PDN connection is not active.

2. The apparatus of claim 1, wherein to determine whether the bearer associated with the PDN connection is active, the at least one processor is further configured to cause the wireless device to:
send dummy data via the bearer associated with the PDN connection; and
determine whether acknowledgement of the dummy data sent via the bearer associated with the PDN connection is received,
wherein it is determined that the bearer associated with the PDN connection is active if acknowledgement of the dummy data sent via the bearer associated with the PDN connection is received, wherein it is determined that the bearer associated with the PDN connection is not active if acknowledgement of the dummy data sent via the bearer associated with the PDN connection is not received.

3. The apparatus of claim 1,
wherein the PDN connection is associated with a service type, wherein determining whether the bearer associated with the PDN connection is active after resuming using receiver circuitry of the wireless device for the first SIM is further based at least in part on one or more conditions associated with the service type being met, wherein the at least one processor is further configured to cause the wireless device to attempt to re-establish the PDN connection based at least in part on the one or more conditions associated with the service type being met.

4. The apparatus of claim 3,
wherein the one or more conditions associated with the service type comprise the service type being in active use at the wireless device.

5. The apparatus of claim 3,
wherein the one or more conditions associated with the service type comprise a timer associated with possible data activity according to the service type being unexpired.

6. The apparatus of claim 1,
wherein the cellular link includes an LTE link,
wherein the bearer associated with the PDN connection includes an evolved packet service (EPS) bearer.

7. A wireless device, comprising:
an antenna;
a radio operably coupled to the antenna; and
at least one processor operably coupled to the radio;
wherein the wireless device is configured to:
  establish a packet data network (PDN) connection via a cellular link with a cellular base station, wherein the PDN connection is established by a non-access stratum (NAS) layer of the wireless device;
  store information identifying a bearer associated with the PDN connection at a radio resource control (RRC) layer of the wireless device;
  determine, at the RRC layer, that the bearer associated with the PDN connection is not active, wherein determining that the bearer associated with the PDN connection is not active is performed based at least in part on operating in RRC idle mode for at least a threshold amount of time after the PDN connection is established;
  provide an indication from the RRC layer to the NAS layer that the bearer associated with the PDN connection is not active; and
  release the PDN connection at the NAS layer based at least in part on the indication that the bearer associated with the PDN connection is not active.

8. The wireless device of claim 7, wherein to determine that the bearer associated with the PDN connection is not active, the wireless device is further configured to:
  receive radio resource control (RRC) reconfiguration information indicating bearer identification information for all active bearers for the wireless device; and
  determine that the RRC reconfiguration information does not indicate bearer identification information for the bearer associated with the PDN connection.

9. The wireless device of claim 7, wherein to determine whether the bearer associated with the PDN connection is active, the wireless device is further configured to:
  send dummy data via the bearer associated with the PDN connection; and
  determine that no acknowledgement of the dummy data sent via the bearer associated with the PDN connection is received.

10. The wireless device of claim 7, wherein the wireless device is further configured to:
  determine whether one or more conditions for keeping the PDN connection active are met; and
  attempt to re-establish the PDN connection at the NAS layer if one or more conditions for keeping the PDN connection active are met.

11. The wireless device of claim 10, wherein the one or more conditions for keeping the PDN connection active comprise one or more of:
  one or more application types or service types associated with the PDN connection being active at the wireless device; or
  a timer associated with keeping the PDN connection active being unexpired.

12. The wireless device of claim 7,
wherein the wireless device comprises a dual subscriber identity module (SIM) dual standby (DSDS) wireless device,
wherein determining that the bearer associated with the PDN connection is not active is performed based at least in part on an interruption to using a first SIM of the DSDS wireless device caused by use of a second SIM of the DSDS wireless device.

13. A method, comprising:
by a wireless device:
  establishing a radio resource control (RRC) connection with a cellular base station;
  establishing a packet data network (PDN) connection via the RRC connection, wherein the PDN connection is established based at least in part on an application type associated with the PDN connection being active at the wireless device;
  storing information identifying a bearer associated with the PDN connection;
  releasing the RRC connection, wherein the wireless device operates in RRC idle mode after the RRC connection is released;
  re-establishing a RRC connection with a cellular base station;
  determining whether an application type associated with the PDN connection is active at the wireless device after re-establishing the RRC connection with a cellular base station;
  determining whether the bearer associated with the PDN connection is active after re-establishing the RRC connection with a cellular base station;
  releasing the PDN connection if the bearer associated with the PDN connection is not active; and
  attempting to re-establish the PDN connection based at least in part on releasing the PDN connection, wherein determining whether the bearer associated with the PDN connection is active after re-establishing the RRC connection, releasing the PDN connection if the bearer associated with the PDN connection is not active, and attempting to re-establish the PDN connection are performed based at least in part on determining that an application type associated with the PDN connection is active at the wireless device after re-establishing the RRC connection.

14. The method of claim 13, wherein determining whether the bearer associated with the PDN connection is active after re-establishing the RRC connection further comprises:
  receiving RRC reconfiguration information indicating bearer identification information for all active bearers for the wireless device; and
  determining whether the RRC reconfiguration information indicates bearer identification information for the bearer associated with the PDN connection.

15. The method of claim 13, wherein determining whether the bearer associated with the PDN connection is active further comprises:
sending data via the bearer associated with the PDN connection; and
determining whether acknowledgement of the data sent via the bearer associated with the PDN connection is received.

16. The method of claim 13,
wherein the application type associated with the PDN connection comprises one or more of:
a gaming application;
an augmented reality (AR) application; or
an internet protocol (IP) multimedia subsystem (IMS) application.

17. The method of claim 13, wherein the method further comprises:
determining whether a timer associated with the PDN connection is expired after re-establishing the RRC connection with a cellular base station,
wherein determining whether the bearer associated with the PDN connection is active after re-establishing the RRC connection, releasing the PDN connection if the bearer associated with the PDN connection is not active, and attempting to re-establish the PDN connection are performed based at least in part on determining that the timer associated with the PDN connection is not expired after re-establishing the RRC connection.

18. The method of claim 13, wherein said attempting to re-establish the PDN connection is further based on a timer associated with possible data associated with the application type being unexpired.

19. The method of claim 13, wherein determining whether the bearer associated with the PDN connection is active is performed based at least in part on operating in RRC idle mode for at least a threshold amount of time after the PDN connection is established.

20. The method of claim 13, wherein the wireless device comprises a dual subscriber identity module (SIM) dual standby (DSDS) wireless device, wherein determining whether the bearer associated with the PDN connection is active is performed based at least in part on an interruption to using a first SIM of the DSDS wireless device caused by use of a second SIM of the DSDS wireless device.

* * * * *